US008839516B2

(12) United States Patent
Bertoli et al.

(10) Patent No.: US 8,839,516 B2
(45) Date of Patent: Sep. 23, 2014

(54) REPAIRING TITANIUM COMPRESSOR BLADES BY COLD COMPACTING

(75) Inventors: Vincenzo Bertoli, Reggio Emilia (IT); Serge De Sanctis, Montreuil (FR); Stephane Rene Julien Giusti, La Chapelle Gauthier (FR); Claude Marcel Mons, Savigny Le Temple (FR)

(73) Assignee: SNECMA, Paris (FR)

( * ) Notice: Subject to any disclaimer, the term of this patent is extended or adjusted under 35 U.S.C. 154(b) by 233 days.

(21) Appl. No.: 13/499,050

(22) PCT Filed: Sep. 28, 2010

(86) PCT No.: PCT/EP2010/064383
§ 371 (c)(1),
(2), (4) Date: Mar. 29, 2012

(87) PCT Pub. No.: WO2011/039197
PCT Pub. Date: Apr. 7, 2011

(65) Prior Publication Data
US 2012/0180278 A1    Jul. 19, 2012

(30) Foreign Application Priority Data

Sep. 29, 2009   (FR) ..................... 09 56730

(51) Int. Cl.
*B23P 6/00*    (2006.01)
*B24B 39/00*    (2006.01)
*B21D 3/16*    (2006.01)
*B23P 9/02*    (2006.01)
*F01D 5/20*    (2006.01)
*F01D 5/00*    (2006.01)

(52) U.S. Cl.
CPC ............... *B21D 3/16* (2013.01); *Y20T 50/673* (2013.01); *F05D 2230/20* (2013.01); *B23P 9/02* (2013.01); *F01D 5/20* (2013.01); *B23P 6/002* (2013.01); *F01D 5/005* (2013.01); *Y20T 50/67* (2013.01)
USPC ............... 29/889.1; 29/89.5; 29/90.3

(58) Field of Classification Search
USPC ........ 29/89.5, 90.1–90.3, 889.1; 72/189, 197, 72/214, 215, 220, 240, 340
See application file for complete search history.

(56) References Cited

U.S. PATENT DOCUMENTS 4,095,451 A * 6/1978 Watton ............................ 72/340
5,479,704 A    1/1996 Richter et al.
(Continued)

FOREIGN PATENT DOCUMENTS

EP    0 638 387    2/1995
EP    1 138 431    10/2001
(Continued)

OTHER PUBLICATIONS
International Search Report Issued Oct. 27, 2010 in PCT/EP10/64383 Filed Sep. 28, 2010.

*Primary Examiner* — Alexander P Taousakis
*Assistant Examiner* — Lee A Holly
(74) *Attorney, Agent, or Firm* — Oblon, Spivak, McClelland, Maier & Neustadt, L.L.P.

(57) ABSTRACT

A method for repairing a compressor blade of a turbine engine, the blade including a cat's tongue at the radial end thereof, the radial extension of which is less than a predefined nominal radial extension. The method includes elongating the cat's tongue via a cold-compacting operation applied to the walls of said tongue, such that the radial elongation thereof becomes greater than the nominal extension. The compacting operation is a rollerburnishing operation carried out by moving the end of the blade between two rollers having rectilinear generatrices and spaced apart by a distance smaller than the thickness of the cat's tongue, along the chord connecting the leading edge with the trailing edge thereof.

9 Claims, 2 Drawing Sheets

(56) References Cited

U.S. PATENT DOCUMENTS

| | | |
|---|---|---|
| 6,339,878 B1 | 1/2002 | Owen et al. |
| 2003/0066192 A1 | 4/2003 | Wilkins et al. |
| 2006/0218788 A1 * | 10/2006 | Boulnois et al. ........... 29/889.72 |
| 2008/0160208 A1 | 7/2008 | Maly et al. |

FOREIGN PATENT DOCUMENTS

| | | |
|---|---|---|
| EP | 1 302 627 | 4/2003 |
| EP | 1 944 387 | 7/2008 |
| JP | 59 30426 | 2/1984 |

* cited by examiner

REPAIRING TITANIUM COMPRESSOR BLADES BY COLD COMPACTING

The field of the present invention is that of aeronautical engines and more specifically that of the repair of the compressor blades of these engines.

Aeronautical engines conventionally consist of an assembly made up of one or more compressors which compress air aspirated into an air intake, a combustion chamber in which fuel mixed with the air is burnt, one or more turbines which tap off some of the power generated by the combustion in order to drive the compressor or compressors and an exhaust nozzle via which the gases produced are ejected. The compressors are produced in the form of a series of stages each comprising a rotor wheel, or rotor, and a stator ring, or stator, all fitted with blading, known respectively as the rotor or stator blading. The rotor blades are held by their internal part, or root, by the engine rotation shaft, their external part, or tip, being positioned facing a compressor casing which envelops the entire air flow path and provides containment for the compressed air.

The compressor blades of airplane engines have a tendency to become worn at their tip because of friction that may occur against the outer casing. This friction occurs during normal operation because of the loading factors dictated by the airplane, which therefore cause relative movements of the engine rotor with respect to the casing surrounding it, or because of wear of the blade root which causes the blade root to move up inside its cavity. It may also occur during abnormal operation, for example as a result of a phenomenon known as compressor surge that might occur, as a result of the ingestion of a foreign body, as a result of excessive vibrations, etc.

It is therefore necessary during periodic engine overhauls to check the length of the blades and, if need be, to regenerate the initial length in order to reduce the clearance between blade and casing, as such clearance is detrimental to the aerodynamic performance of the compressor.

In the prior art, the repair technologies employed, such as the one described in General Electric patent application EP 1302627 for example, involve cutting off the tip of the blade, building the blade back up using welding, then re-machining the blade to its initial geometry. The repair also entails a series of industrial operations such as shot peening in order to place the surface layers under compression so that they are thus better able to withstand vibrational stresses and/or a heat treatment in which the temperature of the blading is increased in order to relieve the internal stresses caused by the welding operation.

This technology quite clearly represents a significant cost, associated firstly with the great many methods employed and, secondly, with the time spent on the repair. The component down-time while the components are being repaired therefore entails carrying what is known as a floating stock of parts so that the engine overhaul line can be continuously provisioned with parts. In addition, the method of building up using welding impairs the characteristics of the material at the blade tip and this leads to certain blades being scrapped because they are no longer able to withstand vibrational stresses.

Also known is a method of lengthening the blade which is described in U.S. Pat. No. 4,095,451, and consists in compressing the blade that is to be repaired between two rollers, one of which has a convex shape and the other a concave shape that reproduces the profile of the blade. The compaction operation is performed by causing the blade to move in its longitudinal direction.

The disadvantage of this method is that it acts on the entire length of the blade rather than acting only on its one end. The strength characteristics of the blade are therefore diminished by reducing the thickness of its airfoil. In addition, this method is suited to just one blade profile and using it on blades of different stages involves changing the rollers.

It is an object of the present invention to overcome these disadvantages by proposing a method for repairing the ends of compressor blades which does not reproduce some of the disadvantages of the prior art and, in particular, which is simpler and quicker to perform and, furthermore, is economical.

To this end, the subject of the invention is a method of repairing a turbomachine compressor blade, said blade at its radial end comprising a squealer tip, the radial extension of which is smaller than a predefined nominal radial extension, said method comprising a step of lengthening said squealer tip using a cold compaction operation performed on the walls of said squealer tip, so that its radial elongation becomes greater than said nominal extension, characterized in that the compaction operation is a roller burnishing operation performed by moving the end of the blade between two rollers with straight generatrices spaced apart by a distance less than the thickness of said squealer tip, along the chord that connects its leading edge to its trailing edge.

A compaction operation such as a roller burnishing operation is particularly simple to perform and does not fundamentally alter the metallurgical characteristics of the radial end of the blade. The advantages of this method are its simplicity, the possibility of operating at room temperature, the absence of post-operational heat treatments (unlike the other methods that involve building up with molten material) and a limit on the dye-penetration inspection non-destructive testing required.

In addition, the use of cylindrical rollers with straight generatrices and the mode of travel along the chord means that the method can be performed on all types of blade without having to adapt the shape of the rollers to suit the profile of the airfoil.

For preference, the separation of the rollers is less than the local thickness of said squealer tip by a value of between 0.1 and 0.5 mm.

In one embodiment, the lengthening is achieved by a succession of roller burnishing passes, the height of which is between 0.1 and 0.5 mm.

For preference, the speed of travel is greater than or equal to 20 m/min.

In one particular embodiment, the pressure applied by the roller burnishing operation varies along the chord of the blade. Whereas the preferred method of roller burnishing is to maintain a constant distance between the rollers, which leads to a constant thickness of blade squealer tips, it may be advantageous to alter the pressure applied in order to alter the thickness of the squealer tip.

In another embodiment, the axes of the rollers are inclined with respect to the plane perpendicular to the direction of travel, their upper part being offset forward with respect to the direction of travel. For preference, the angle of inclination of the axes of the rollers is less than 5°.

Advantageously, the method is applied to a blade made of a titanium alloy. For preference, the titanium alloy is TA6V. It will be noted that it is possible to carry out an operation of lengthening a part made of titanium alloy using roller burnishing or cold heading, despite the high stiffness of this alloy.

The invention will be better understood, and other objects, details, features and advantages thereof will become more clearly apparent during the course of the detailed explanatory description which follows of one embodiment of the invention given by way of purely illustrative and non-limiting example with reference to the attached schematic drawings.

Figure 1:
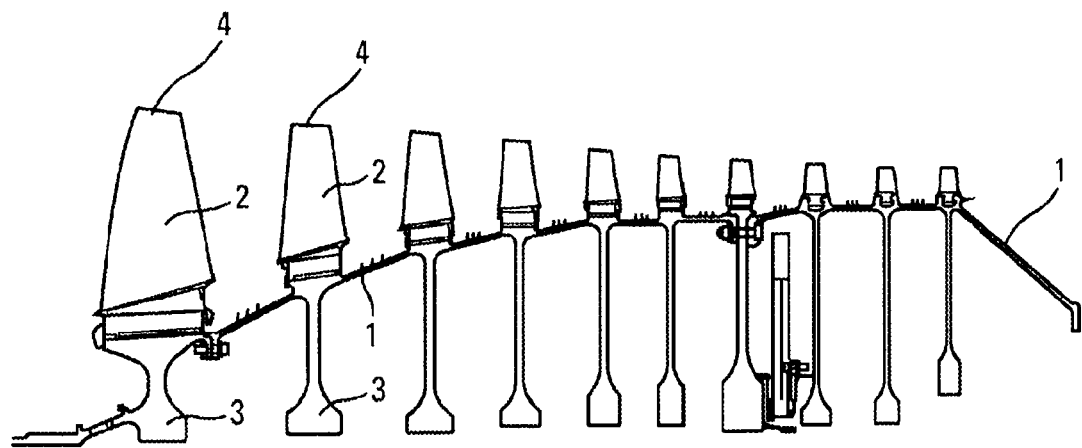
FIG. 1 is an overall view in cross section of a compressor rotor for a turbomachine.

Reference is made to FIG. 1 which is a cross section of the rotor 1 of a turbomachine compressor, comprising blades 2 mounted on the rotor 1 and compressor disks 3 facing the blades 2 inside the rotor 1. Each blade 2 has a root fixed to the rotor 1 by techniques known to those skilled in the art and extends as far as an end, or tip edge 4, to which the repair method that forms the subject of the invention relates.

Figure 2:
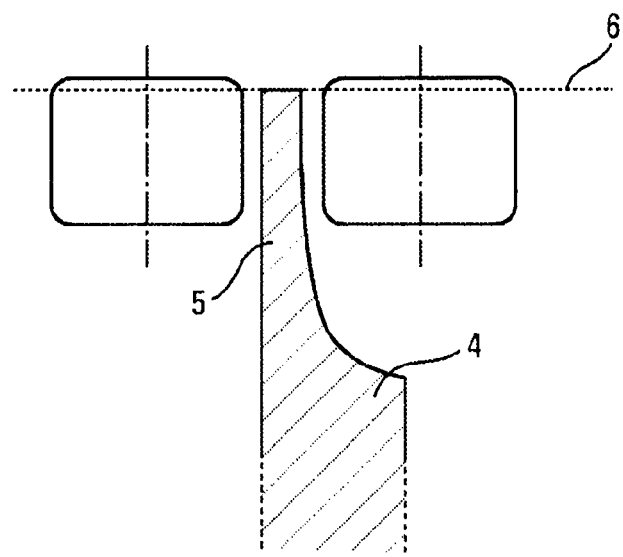
FIGS. 2 and 3 are views in cross section of the radial end of a compressor blade before and after application of a repair method according to one embodiment of the invention.

Reference is made to FIG. 2 which is a radial cross section of a blade tip, the shape of which has a tip edge 4 of a thickness defined by the desired mechanical strength properties, which is extended radially by a thinner part 5, known to those skilled in the art as squealer tip, the function of which is to seal against the casing surrounding the compressor. This squealer tip is thinned so that it occasionally penetrates into an abradable material bonded to the casing thus leaving a clearance between the tip 4 of the airfoil and the casing which is as small as possible. FIG. 2 also depicts a dimensional allowance 6 corresponding to the nominal dimension of the radial extension that the blade is to have in position on the rotor in order to correctly control the clearance to the casing. The blade described in FIG. 2 has a radial extension corresponding exactly to the nominal dimension of the clearance.

There is a tolerance on the radial extension of the blade, with respect to this nominal dimension, below which the blade is considered unable to operate on the engine. It therefore has to be sent back for repair so that it can regain sufficient radial extension.

Figure 3:
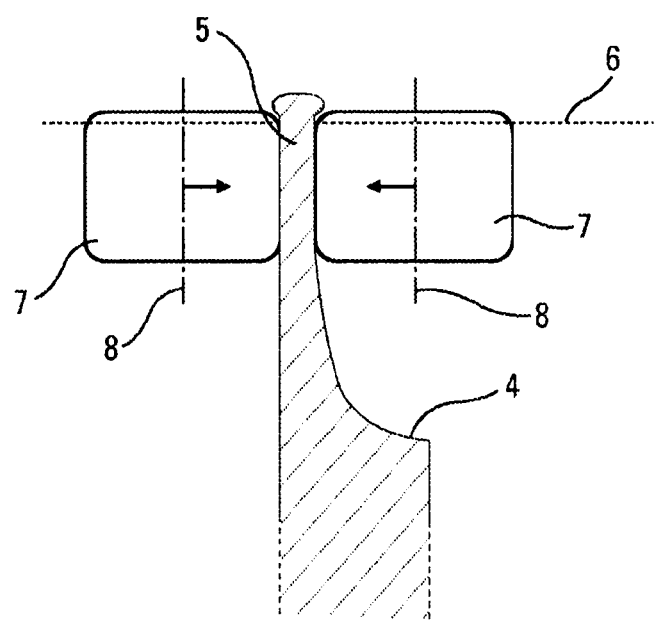

Reference is now made to FIG. 3 which shows a compressor blade 2, the airfoil tip 4 of which also has a squealer tip 5. The squealer tip 5 here is depicted between two rollers 7 made of hard metal, of a cylindrical shape with straight generatrices, which are performing a roller burnishing operation thereon; it is pressed between the rollers which apply a significant pressure to the two sides of the radial end of the squealer tip 5 in order to thin it and thus upset metal outwards. The roller burnishing operation is performed by moving the end of the blade 2 between the rollers 7 which are rotating about their axis 8, along the chord connecting its leading edge to its trailing edge. Because of this thinning created by the roller burnishing, the squealer tip lengthens and its radial end once again crosses the line of nominal extension of the blade in question. This blade is therefore once again ready to enter service on an engine.

The roller burnishing operation is a cold deformation operation known per se which involves, without the removal of material, smoothing and compacting the surface of the materials through a plastic deformation of the peripheral layers of the component. It is generally used to obtain a high surface quality, with a view to acquiring good friction or sealing properties against the surrounding parts. Because of the surface compaction, it also increases the hardness of the part and this is associated with an improvement to its resistance to wear, to corrosion and its fatigue strength.

It is not generally used with a view to upsetting metal or making a part thinner.

It is known that a roller burnishing can be applied to all deformable materials. In general, it is reckoned that the hardness of the material must not exceed a Rockwell hardness set at 45 HRC in order for the roller burnishing operation to be feasible. Moreover, the material needs to have sufficient aptitude to elongation, characterized by an elongation at rupture of more than 5%.

A person skilled in the art would therefore consider that this method is applicable essentially to steel-based alloys. Given the particular characteristics of titanium alloys, he/she would not be inclined to envision applying roller burnishing to this material.

The applicant company has acted contrary to these preconceived ideas and has, first of all, noted that roller burnishing can be applied to an alloy such as TA6V which is predominantly used for the manufacture of turbomachine compressor blades, even though its hardness is rather close to the 45 to 50 HRC value and even though its elongation at rupture is around 8%, which is very close to the commonly accepted lower limit. Secondly, it has noted that the operation results not only in a compaction of the surface but also in a lengthening of the squealer tip 5 of the blades.

The use of this roller burnishing method thus allows compressor blades to be repaired by lengthening their squealer tip in the cold state while at the same time maintaining their profile, using an operation that is simple and inexpensive.

The sequence of events in a roller burnishing operation according to the invention, applied to an end 4 of a compressor blade 2 made of a titanium alloy, will now be described.

With its root facing downwards, the blade 2 is positioned between the two rollers 7, with the central surface of its airfoil tangential to the rollers at the points at which they make contact with it. The separation of the rollers 7 is typically set around 0.2 mm below the thickness of the squealer tip 5. This value can vary between 0.1 and 0.5 according to the design of the blading. This separation is generally constant but, in order to take account of the profile of the blade and the variation in thickness it exhibits along its chord, the relative position of the rollers 7 may advantageously be variable so as to maintain a separation of 0.2 mm less than the local thickness of the squealer tip. In the latter instance, the procedure is preferably performed using a numerically controlled machine. Such a procedure notably allows the repair method according to the invention to be performed on all types of blade, irrespective of their profile. To do so, all that is required is for the shape of the chord of the blade to be programmed into the machine software.

A predetermined pressure is applied to the rollers to cause material to be displaced by a thinning of the squealer tip 5 with material being upset upwards, while a pressure is applied to the blade, in the direction of its chord, to cause it to move forward between the rollers 7.

In the case under consideration here of a blade made of titanium alloy TA6V, a roller burnishing operation, with a setting of 0.2 mm as indicated above, can be performed over a height of 0.15 mm at a speed of travel of 22 m/min. This height is typically between 0.10 and 0.50 mm for a blade made of titanium alloy. Several passes are made between the radius at the end of the squealer tip and the tip of the blade in order to push upward the bulge that is created above the rollers and achieve the desired lengthening of the squealer tip 5.

There are a number of alternative forms of embodiment conceivable for implementing this method. In one first alternative form of embodiment, the pressure applied to the rollers is not constant but decreases as the blade 2 moves forward between the rollers 7, the pressure at exit being equal to approximately 50% of its entry value. The change in pressure follows the variation in thickness of the airfoil along its profile so that the roller burnishing impression is likeable to a surface parallel to the surface of the airfoil.

In another alternative form of embodiment, the axes 8 of the rollers 7 are inclined with respect to the plane perpendicular to the direction of travel, their upper part being offset forward with respect to this direction of travel, this making it easier for the material to travel up along the airfoil. The angle used is preferably chosen to be less than 5° in order to achieve correct roller burnishing, which means in order not to create a stepped effect along the squealer tip.

The invention has been described with a movement of the airfoil between two rollers and a roller burnishing over a predetermined height of pass. It could just as easily be performed on a stationary airfoil with cold heading applied, in a number of passes, to the squealer tip 5, using a die, the height of which substantially corresponds to the height of pass adopted.

Although the invention has been described in conjunction with one particular embodiment, it is quite clear that it comprises all technical equivalents of the means described and combinations thereof where these fall within the scope of the invention.

The invention claimed is:

1. A method of repairing a turbomachine compressor blade, the blade at its radial end including a squealer tip, the radial extension of which is smaller than a predefined nominal radial extension, the method comprising:

lengthening the squealer tip using a cold compaction operation performed on walls of the squealer tip, so that its radial elongation becomes greater than the nominal extension, wherein the compaction operation includes a roller burnishing operation performed by moving the end of the blade between two rollers spaced apart by a distance less than the thickness of the squealer tip, wherein the moving of the end of the blade is performed along a chord that connects its leading edge to its trailing edge.

2. The method as claimed in claim 1, in which the separation of the rollers is less than a local thickness of the squealer tip by a value of between 0.1 and 0.5 mm.

3. The method as claimed in claim 1, in which the lengthening is achieved by a succession of roller burnishing passes, the height of which is between 0.1 and 0.5 mm.

4. The method as claimed in claim 3, in which a speed of travel of the end of the blade is greater than or equal to 20 m/min.

5. The method as claimed in claim 1, in which pressure applied by the roller burnishing operation varies along the chord of the blade.

6. The method as claimed in claim 1, in which axes of the rollers are inclined with respect to the plane perpendicular to the direction of travel, their upper part being offset forward with respect to a direction of travel of the end of the blade.

7. The method as claimed in claim 6, in which an angle of inclination of the axes of the rollers is less than 5°.

8. The method as claimed in claim 1, applied to a blade made of a titanium alloy.

9. The method as claimed in claim 8, in which the titanium alloy is TA6V.

* * * * *